(12) United States Patent
Kohler et al.

(10) Patent No.: US 11,590,973 B2
(45) Date of Patent: Feb. 28, 2023

(54) DRIVER ASSISTANCE SYSTEM FOR MOTOR VEHICLES

(71) Applicant: Robert Bosch GmbH, Stuttgart (DE)

(72) Inventors: Lukas Kohler, Schoental-Bieringen (DE); Thorsten Schori, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 43 days.

(21) Appl. No.: 17/090,476

(22) Filed: Nov. 5, 2020

(65) Prior Publication Data

US 2021/0155234 A1     May 27, 2021

(30) Foreign Application Priority Data

Nov. 27, 2019 (DE) .......................... 102019218340.9
Mar. 30, 2020 (DE) .......................... 102020204078.8

(51) Int. Cl.
| | | |
|---|---|---|
| *B60W 30/14* | (2006.01) | |
| *B60W 40/04* | (2006.01) | |
| *B60W 40/08* | (2012.01) | |
| *B60W 30/18* | (2012.01) | |
| *G05D 1/02* | (2020.01) | |

(52) U.S. Cl.
CPC ...... *B60W 30/14* (2013.01); *B60W 30/18163* (2013.01); *B60W 40/04* (2013.01); *B60W 40/08* (2013.01); *G05D 1/0212* (2013.01); *B60W 2540/10* (2013.01); *B60W 2554/4041* (2020.02)

(58) Field of Classification Search
CPC .. B60W 30/14; B60W 30/143; B60W 30/146; B60W 30/18163; B60W 40/04; B60W 40/08; B60W 2540/10; B60W 2554/4041; B60W 2754/30; B60W 30/16; B60W 30/162; B60W 30/165; B60W 2540/00; B60W 30/09; B60W 30/095; G05D 1/0212
USPC .......................................................... 701/26
See application file for complete search history.

(56) References Cited

U.S. PATENT DOCUMENTS

| | | | | |
|---|---|---|---|---|
| 6,256,584 | B1 * | 7/2001 | Kodaka .............. | B62D 15/0265 340/904 |
| 10,173,680 | B2 * | 1/2019 | Ono .................... | B60W 30/143 |
| 2003/0217880 | A1 * | 11/2003 | Isogai .................. | B60W 30/16 180/170 |

(Continued)

*Primary Examiner* — Fadey S. Jabr
*Assistant Examiner* — Mohamed Abdo Algehaim
(74) *Attorney, Agent, or Firm* — Norton Rose Fulbright US LLP; Gerard Messina (57) ABSTRACT

A driver assistance system for motor vehicles, including a locating system for locating preceding vehicles and a longitudinal guidance module for controlling the longitudinal movement of the host vehicle as a function of location data of located objects. The longitudinal guidance module includes a driving path module, for defining a driving path ahead of the host vehicle, and an adaptive cruise control function, which adjusts a time gap between the host vehicle and a target object located within the driving path to a setpoint value. The longitudinal guidance module includes a dynamic function which, under certain conditions indicating that the target object will leave the driving path, modifies the longitudinal guidance function within the context of a more rapidly commencing acceleration in response to a command of the driver.

7 Claims, 4 Drawing Sheets

(56) References Cited

U.S. PATENT DOCUMENTS

| | | | |
|---|---|---|---|
| 2007/0150196 A1* | 6/2007 | Grimm | B60T 7/22 348/148 |
| 2009/0037071 A1* | 2/2009 | Inoue | B60W 30/146 701/96 |
| 2009/0248267 A1* | 10/2009 | Boecker | B60W 30/17 701/70 |
| 2010/0057321 A1* | 3/2010 | Randler | B60W 30/16 701/96 |
| 2010/0299043 A1* | 11/2010 | Dorenkamp | B60W 30/16 701/96 |
| 2010/0324797 A1* | 12/2010 | Fritz | B60W 10/06 701/1 |
| 2011/0276246 A1* | 11/2011 | Kuze | B60W 30/16 701/96 |
| 2012/0053755 A1* | 3/2012 | Takagi | G01S 7/4808 701/1 |
| 2012/0191318 A1* | 7/2012 | Holzmann | B60W 50/06 701/96 |
| 2013/0024075 A1* | 1/2013 | Zagorski | B60W 30/0956 701/1 |
| 2013/0226431 A1* | 8/2013 | Lu | B60W 30/16 701/96 |
| 2015/0025706 A1* | 1/2015 | Roth | B60W 30/16 701/1 |
| 2015/0039156 A1* | 2/2015 | Shibata | B60W 30/09 701/1 |
| 2015/0367853 A1* | 12/2015 | Yaguchi | B60W 30/188 701/99 |
| 2015/0375744 A1* | 12/2015 | Kato | B60W 30/16 701/96 |
| 2016/0159353 A1* | 6/2016 | Yun | B60W 30/16 701/93 |
| 2016/0304092 A1* | 10/2016 | Rebhan | B60W 30/16 |
| 2016/0313738 A1* | 10/2016 | Kindo | G05D 1/0257 |
| 2017/0080941 A1* | 3/2017 | Ono | B60W 30/143 |
| 2017/0240177 A1* | 8/2017 | Fujii | B60W 30/18163 |
| 2018/0037227 A1* | 2/2018 | D'sa | B60W 30/16 |
| 2018/0118203 A1* | 5/2018 | Minemura | B60W 10/20 |
| 2018/0297594 A1* | 10/2018 | Takahashi | B60W 30/025 |
| 2018/0312163 A1* | 11/2018 | Minemura | B60T 7/22 |
| 2018/0357904 A1* | 12/2018 | Miyata | B60W 30/18163 |
| 2019/0056729 A1* | 2/2019 | Ferguson | G06Q 10/0635 |
| 2019/0071077 A1* | 3/2019 | Miyamoto | B60W 30/16 |
| 2019/0258251 A1* | 8/2019 | Ditty | G06V 20/58 |
| 2019/0367032 A1* | 12/2019 | Ito | B60W 50/00 |
| 2020/0039510 A1* | 2/2020 | Kume | B60W 30/09 |
| 2020/0139967 A1* | 5/2020 | Beller | B60W 30/143 |
| 2020/0276972 A1* | 9/2020 | Ito | B60W 30/18136 |
| 2020/0282990 A1* | 9/2020 | Sato | B60W 30/12 |
| 2020/0384994 A1* | 12/2020 | Pfau | B60W 10/06 |
| 2022/0203992 A1* | 6/2022 | Taniguchi | G08G 1/167 |

* cited by examiner

DRIVER ASSISTANCE SYSTEM FOR MOTOR VEHICLES

CROSS REFERENCE

The present application claims the benefit under 35 U.S.C. § 119 of German Patent Application No. DE 102019218340.9 filed on Nov. 27, 2019, and German Patent Application No. DE 102020204078.8 filed on Mar. 30, 2020, which are both expressly incorporated herein by reference in its entirety.

FIELD

The present invention relates to a driver assistance system for motor vehicles, including a locating system for locating preceding vehicles and a longitudinal guidance module for controlling the longitudinal movement of the host vehicle as a function of location data of located objects, the longitudinal guidance module including a driving path module, for defining a driving path ahead of the host vehicle, and an adaptive cruise control function, which adjusts a time gap between the host vehicle and a target object located within the driving path to a setpoint value.

BACKGROUND INFORMATION

A locating system may, for example, be formed by one or multiple angle-resolving radar sensors or by a video system and is able to also identify transverse movements of the located objects, in addition to distances and relative velocities. In particular, it is thus possible to identify whether an object is situated inside or outside the driving path. The adaptive cruise control function only responds to objects inside the driving path, and, among these objects, selects the one that has the smallest distance as the target object with respect to which the distance is adjusted. In general, the spatial distance between the vehicles is not directly regulated, but rather the time gap, i.e., the temporal distance, by which an automatic adaptation of the spatial distances to the particular driving speed is achieved.

The width of the driving path is equal to the width of the host vehicle, plus a certain safety margin, so that objects situated outside the driving path may, in any case, be safely passed.

In a clear travel situation, i.e., when no target object is located, the speed of the host vehicle is adjusted to a desired speed selectable by the driver. When the host vehicle then approaches a slower preceding vehicle inside the driving path, the adaptive cruise control function becomes active, and the system transitions into a following travel mode in which the preceding vehicle is followed at an adequate safety distance. In general, the driver is able to select the time gap within certain limits, which defines the safety distance.

When the driving path is dimensioned to be relatively narrow, there is the risk that a target object is temporarily lost in curves or during random course deviations of the preceding vehicle. This results in an agitated and uncomfortable driving mode, with alternating accelerations and decelerations. To ensure sufficient target object stability, the width of the driving path is therefore, in general, selected to be relatively large.

When, in a following travel situation, the slower preceding vehicle pulls out into another lane, the consequence of selecting a wide driving path, however, is that the host vehicle is first accelerated again with a certain delay since the adaptive cruise control function only releases the target object when it has left the relatively wide driving path. In certain situations, for example when the preceding vehicle pulls out into a gap between trucks on the slower adjoining lane, this may result in an impediment since the passing maneuver takes so long that the driver of the passed vehicle has to reduce his or her speed so as not to pull up to the next truck too closely. With a higher traffic volume, an impediment of the traffic flow thus occurs.

In principle, the driver always has the option with a driver assistance system to override the adaptive cruise control function by actively actuating the gas pedal. Even though a higher acceleration is thus temporarily achievable, this greater acceleration only remains in effect while the driver actuates the gas pedal. The improvement in the comfort which is actually to be achieved by the driver assistance system is thereby limited.

SUMMARY

It is an object of the present invention to provide a driver assistance system which enables a smoother traffic flow with high comfort and high safety.

This object may be achieved according to example embodiments of the present invention in that the longitudinal guidance module has a dynamic function which, under certain conditions indicating that the target object will leave the driving path, modifies the longitudinal guidance function within the context of a more rapidly commencing acceleration in response to a command of the driver.

When the driver recognizes that the preceding vehicle is about to pull out, but this vehicle has not yet left the driving path, the driver, with the aid of a brief command (for example by lightly actuating and holding the gas pedal or, in the case of single-track vehicles, the throttle twist grip), may thus activate the dynamic function and thereby achieve that the acceleration of the host vehicle to the desired speed already commences before the target object has left the driving path.

The input of a driver command, in particular for requesting an acceleration, or the input device for inputting a driver command is mentioned within the scope of the present application and the described present invention. Such a device may be a gas pedal, which is actuated by the driver's foot, in the case of two-track vehicles. As an alternative, modifications of this input device which fulfill the same task as the gas pedal are also possible. These are, for example, devices for hand throttle operation, as they are offered as special accessories by most vehicle manufacturers or hand throttle twist levers or speed twist grips, as they are used in single-track vehicles such as motor scooters, motorcycles or in motor-operated three-wheelers (trikes) or quads.

Such alternatives are understood, and those skilled in the art would arrive at these alternative devices established in the market without exercising inventive skills.

Within the scope of the present application, only the term "gas pedal" is used hereafter for the sake of easier comprehensibility and easier readability; however all further alternatives understood by those skilled in the art are also encompassed thereby, such as hand throttle grips or hand twist grips or speed twist grips.

In this way, passing maneuvers may be shortened, without the driver having to hold the gas pedal depressed or hold the twist grip twisted the entire time.

Advantageous embodiments and refinements of the present invention are described herein.

In accordance with an example embodiment of the present invention, a more rapid commencement of the acceleration may be achieved in a variety of ways, for example by a temporary narrowing of the driving path, in particular on the side toward which the preceding vehicle is pulling out, or also by a temporary reduction of the setpoint time gap. In the first case, it is achieved that the acceleration commences sooner. In the latter case, the host vehicle is accelerated to shorten the distance corresponding to the reduction of the time gap. Before the shorter setpoint distance is achieved, however, the preceding vehicle will, in general, have left the driving path so that the acceleration is maintained until the desired speed has been reached.

A positive effect of the reduction of the time gap may also be that, in response to the greater setpoint acceleration, the transmission management system of the vehicle automatically shifts to a lower gear level. In this way, the drive train of the vehicle is prepared for a more dynamic acceleration process at an early stage, so that it is then possible, in clear travel, to accelerate more rapidly to the desired speed.

The driver command by which the dynamic function is triggered may be input via the gas pedal or a twist grip of the vehicle, or selectively also in another manner, for example by actuating an acceleration button. The input via the gas pedal or, in the case of single-track vehicles, via a twist grip, however, has the advantage that, via the extent of the pedal actuation, it is also possible to determine the threshold or the intensity at which the dynamic function takes effect. For example, in the case of a stronger actuation of the gas pedal or of the twist grip, the driving path may be further narrowed or the time gap may be reduced more strongly.

One exemplary embodiment is described in greater detail below based on the figures.

DETAILED DESCRIPTION OF EXAMPLE EMBODIMENTS

Figure 1:
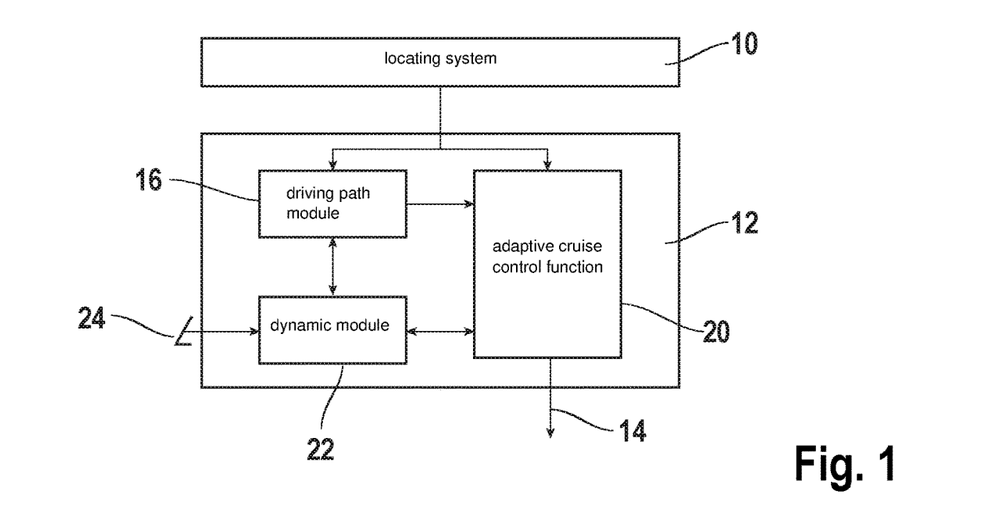
FIG. 1 shows a block diagram of a driver assistance system according to an example embodiment of the present invention.

The driver assistance system shown in FIG. 1 includes a locating system 10, for example an angle-resolving radar sensor, and a longitudinal guidance module 12, which controls the longitudinal guidance of the vehicle based on the location data received from locating system 10 by outputting commands to a drive system of the vehicle, which is not shown, via an output 14.

Longitudinal guidance module 12 includes a driving path module 16 which, based on data it receives from locating system 10 and/or based on dynamic data which characterize the movement state of the host vehicle, defines a driving path 18 (FIG. 2) ahead of the host vehicle, i.e., a strip-shaped zone on the roadway which extends essentially in the driving direction and which at least has the width of the host vehicle and within which the vehicle will presumably move during the further course of the trip. Specifically, the driving path module 16 establishes a left and a right boundary of driving path 18.

Longitudinal guidance module 12 furthermore includes an adaptive cruise control function 20, which is also shown symbolically here as a block and which is active whenever at least one preceding vehicle is located inside driving path 18. For this purpose, the adaptive cruise control function compares the location data, in particular the lateral positions of the located non-stationary objects, to the boundaries of the driving path supplied by driving path module 16. The object inside the driving path for which the smallest distance is measured forms the target object for the adaptive cruise control. Based on the distance and the relative speed of the target object, a positive or negative setpoint acceleration, which is then output via output 14, is calculated in such a way that the host vehicle follows the target object with a time gap selectable by the driver.

Longitudinal guidance module 12 furthermore includes a dynamic module 22, which receives the location data of the target object as well as the driving path data via the adaptive cruise control function and/or driving path module 18. Dynamic module 22 is connected to an input device 24, which in the shown example is formed by the gas pedal or a twist grip and via which the driver is able to actively input a command. When the location data of the target object indicate that this target object is about to leave the driving path, and when the dynamic module at the same time receives the driver command, dynamic module 22 acts on adaptive cruise control function 20 in such a way that an acceleration of the host vehicle, which would normally only occur when the target object has in fact left the driving path, already commences sooner and/or is more pronounced.

Figure 2:
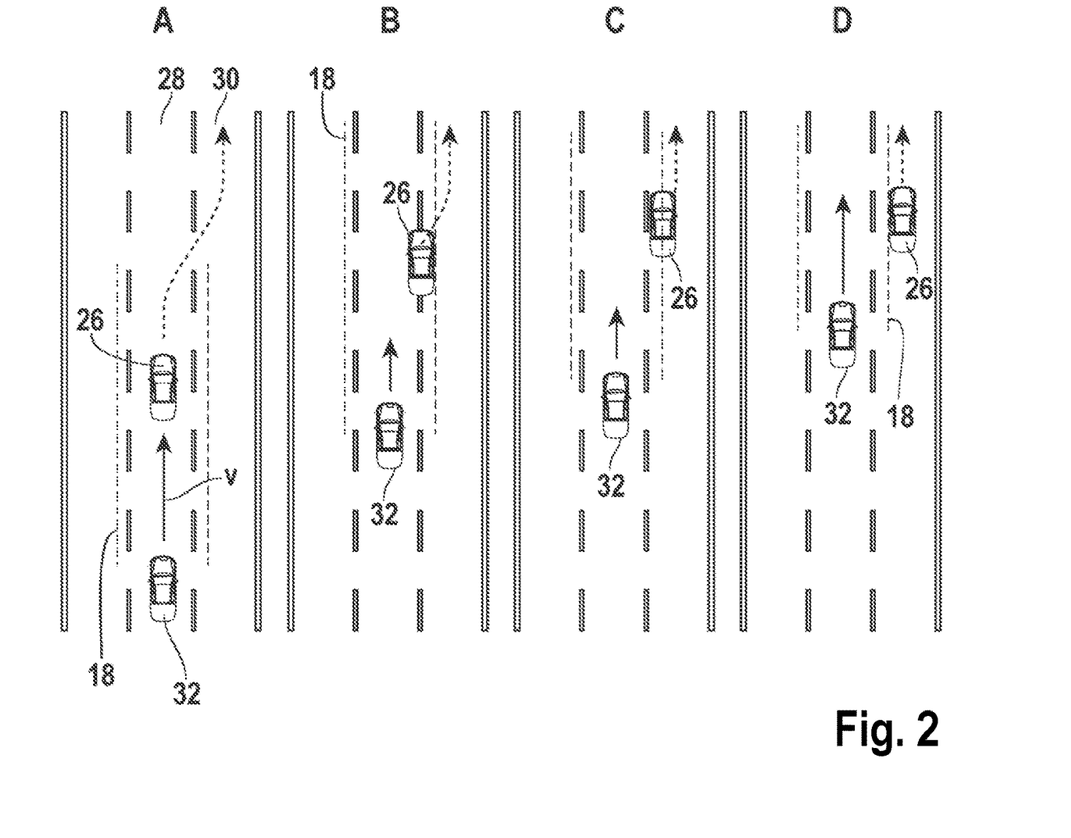
FIG. 2 shows four stages of a traffic situation in which a vehicle initially followed in following travel pulls out into an adjoining lane.
Figure 3:
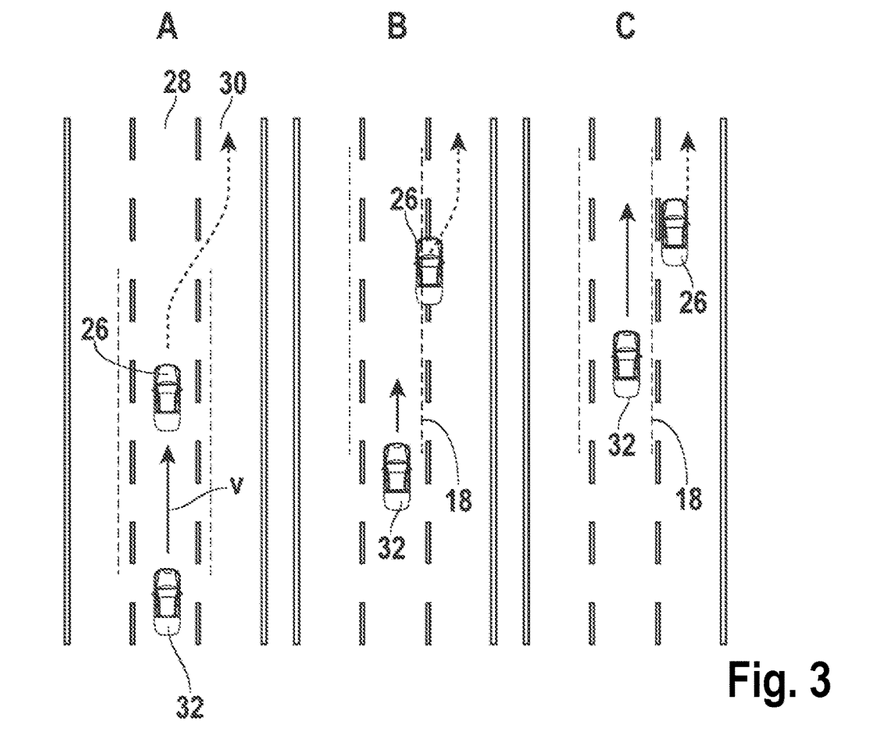
FIG. 3 shows the sequence of the same traffic situation as in FIG. 2 using a driver assistance system according to the present invention.

The purpose of dynamic module 24 is to be explained based on FIGS. 2 and 3.

FIG. 2 shows four stages A, B, C, D of a traffic situation in which a vehicle 26 switches from a central lane 28 of a roadway onto a right adjoining lane 30. The future course of vehicle 26 is indicated by a dotted arrow. A following vehicle 32 is equipped with a driver assistance system and is to be referred to hereafter as "the host vehicle." It is assumed in FIG. 2 that the driver assistance system is a conventional system, which does not include dynamic module 22. Velocity v of host vehicle 32 is indicated by a vector arrow.

In stage A, velocity v of host vehicle 32 is greater than that of preceding vehicle 26 so that the distance between the vehicles decreases. Locating system 10 has detected preceding vehicle 26 and recognized that this vehicle is situated inside driving path 18. Adaptive cruise control function 20 orders a negative acceleration of the host vehicle so that its velocity decreases, and the host vehicle does not pull up too closely to preceding vehicle 26.

In stage B, velocity v of the host vehicle has decreased to the velocity of the preceding vehicle, so that the distance and the time gap between the two vehicles remain constant. The preceding vehicle has moved slightly to the right and is in the process of crossing the boundary between lanes 28 and 30. However, it is still situated inside driving path 18, so that the adaptive cruise control is continued.

In stage C, preceding vehicle 26 has completely left central lane 28 so that host vehicle 32 could actually accelerate again. However, since preceding vehicle 26 has not yet completely left driving path 18, it is not yet released as a target object, and the adaptive cruise control is continued further, so that the host vehicle continues to drive at the slower velocity of preceding vehicle 26, and follows it with a constant time gap.

Only in stage D has preceding vehicle 26 left driving path 18, and host vehicle 32 is accelerated again, so that a passing maneuver is initiated.

FIG. 3 shows the sequence of the same traffic situation as in FIG. 2; however, this time under the assumption that the host vehicle is equipped with a driver assistance system according to the present invention including dynamic module 22. In stage A, the situation is the same as in FIG. 2. In stage B, the locating system has recognized that the lateral position of preceding vehicle 26 has changed. The driver of host vehicle 32 also recognizes that preceding vehicle 26 is about to pull out onto adjoining lane 30, and he or she thereupon actuates input device 24 to trigger the dynamic function. The dynamic function thereupon causes driving path 18 to be narrowed in that the right boundary of the driving path is moved to the left. Preceding vehicle 26, however, has also not yet left the narrowed driving path, so that the adaptive cruise control is continued further in stage B.

In stage C, preceding vehicle 26 has not only left central lane 28 completely, but also driving path 18, so that the adaptive cruise control function releases vehicle 26 as a target object, and already in this stage allows the acceleration of host vehicle 32. The passing maneuver is thus initiated sooner and accordingly is completed sooner, so that vehicle 26 is able to switch sooner again to the central adjoining lane 28 when an even slower vehicle is driving further ahead.

Figure 4:
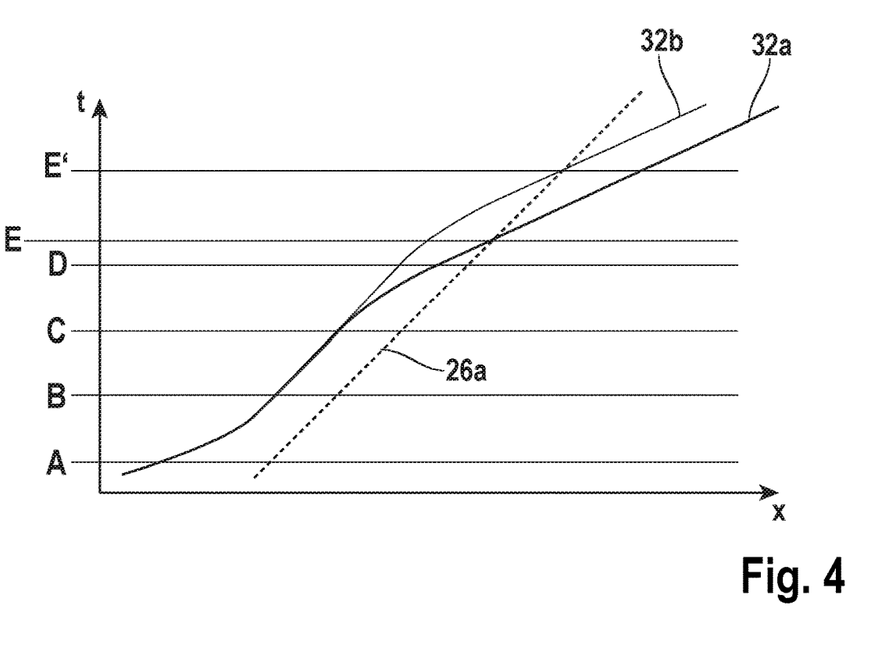
FIG. 4 shows a representation of the motion sequences according to FIG. 3 in a path/time diagram.

FIG. 4 shows the motion sequence illustrated in FIG. 3 in the form of a path/time diagram. Time t is plotted on the vertical axis, and location x in the longitudinal direction of the roadway is plotted on the horizontal axis. A curve 26a shown with dotted lines indicates the location of preceding vehicle 26 as a function of time t. A curve 32a shown in solid lines indicates the location of host vehicle 32 in the motion sequence according to FIG. 3. By comparison, a curve 32b shows the location of host vehicle 32 in the motion sequence according to FIG. 2. The points in time which correspond to stages A through D in FIGS. 2 and 3 are all plotted as horizontal lines.

Dynamic module 22 causes host vehicle 32 to already be accelerated again in stage C, as is indicated by curve 32a. Vehicle 26 is passed (curve 32a intersects curve 26a) at a point in time E. Without the dynamic module, the acceleration of the host vehicle would only just have begun at this point in time (stage D), and vehicle 26 would not be passed until a considerably later point in time E'.

Figure 5:
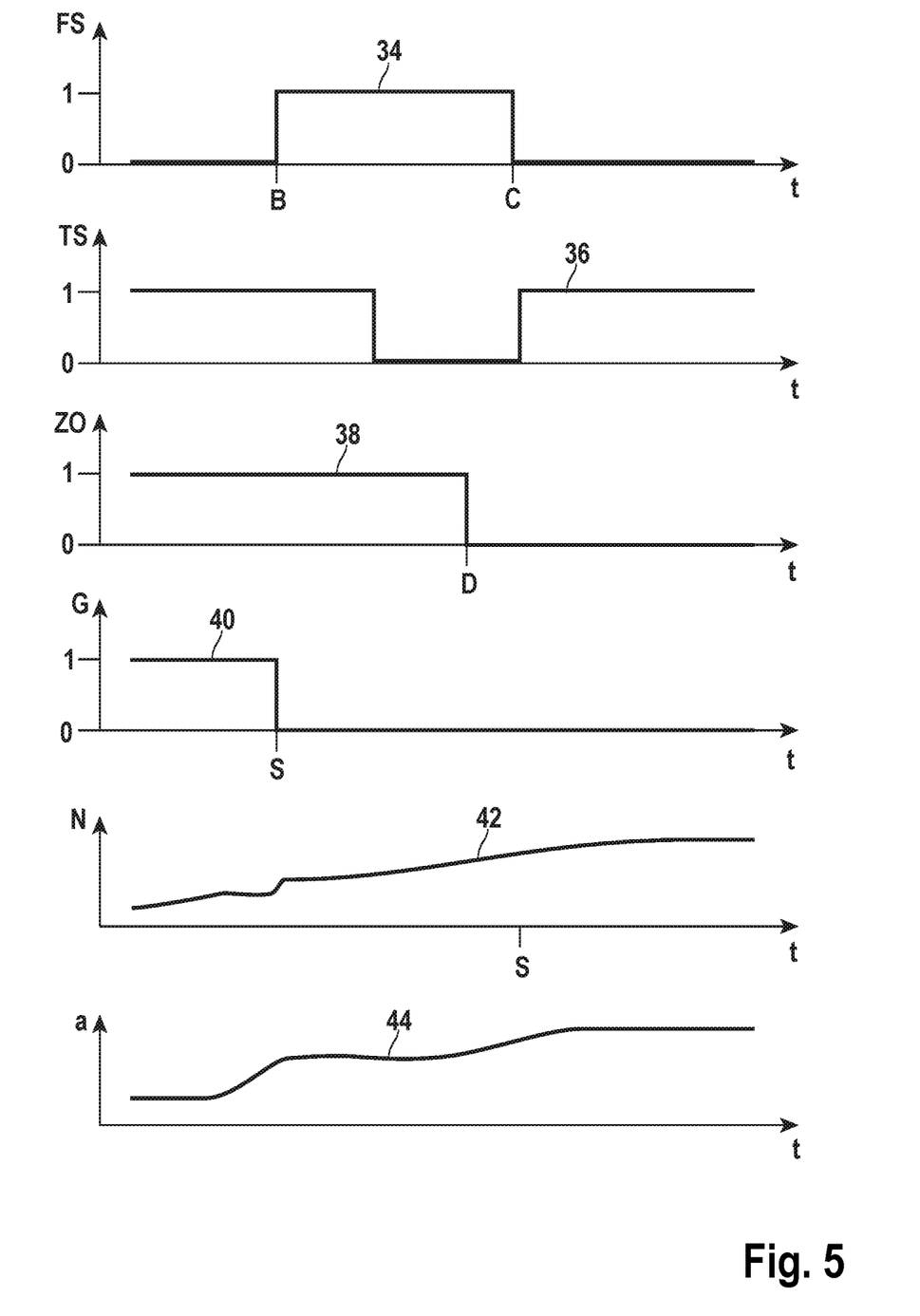
FIG. 5 shows diagrams to illustrate the chronological progression of different parameters and variables in a driver assistance system according to an example embodiment of the present invention.

FIG. 5 illustrates an example in which dynamics module 22 not only causes a reduction of the driving path, but also a reduction of the setpoint time gap with which the target object is followed. Curve 34 in the upper diagram in FIG. 5 indicates the progression of a logic variable FS as a function of time t. When this variable has the value 0, driving path 18 has the regular width. When, in contrast, the variable has the value 1, the width of the driving path is reduced by a certain amount. This amount may be fixed or variable and, in any case, is selected in such a way that the width of the driving path is greater than the width of the host vehicle.

Curve 36 in the second diagram in FIG. 5 indicates the value of a logic variable TS as a function of time t. This variable denotes a reduction in the setpoint time gap with which vehicle 26 is followed. TS=1 means that the adaptive cruise control takes place with the regular time gap selected by the driver. TS=0 means that the time gap is decreased by a certain amount, so that host vehicle 32 is temporarily accelerated. In the shown example, the driving path reduction begins in stage B, and the setpoint time gap is also reduced a little later.

Curve 38 in the third diagram in FIG. 5 indicates the state of a logic variable ZO as a function of time t. Variable ZO indicates whether the target object is detected (ZO=1) or released (ZO=0). In the shown example, the release of the target object takes place at point in time D.

Curve 40 in the fourth diagram in FIG. 5 indicates the value of a logic variable G as a function of time t. Variable G marks the gear change at which the gear level of the vehicle transmission is reduced by one gear to enable a swifter acceleration. This gear change is automatically triggered by the transmission management system of the vehicle, depending on the acceleration requirements output via output 14.

Curve 42 in FIG. 5 indicates rotational speed N of the drive motor as a function of time t, and curve 44 indicates acceleration a of the host vehicle as a function of time t.

In the shown example, the timing of the reduction of the time gap represented by variable TS is selected in such a way that the phase of the temporary acceleration triggered by the reduction of the time gap has not yet been completed at point in time D at which the target object is released. In this way, it is prevented that the vehicle is decelerated again so as to maintain the reduced setpoint distance before the acceleration commences again at point in time D. As is indicated by curve 40, the gear change in this example takes place simultaneously with the reduction of the time gap (curve 36). Rotational speed N increases suddenly in the process, corresponding to the smaller gear level, and then another rotational speed build-up corresponding to the acceleration of the vehicle follows. As a result of the gear change and the corresponding increase in rotational speed at point in time S, the driver receives the feedback that the dynamic function was triggered in response to his/her command.

Figure 6:
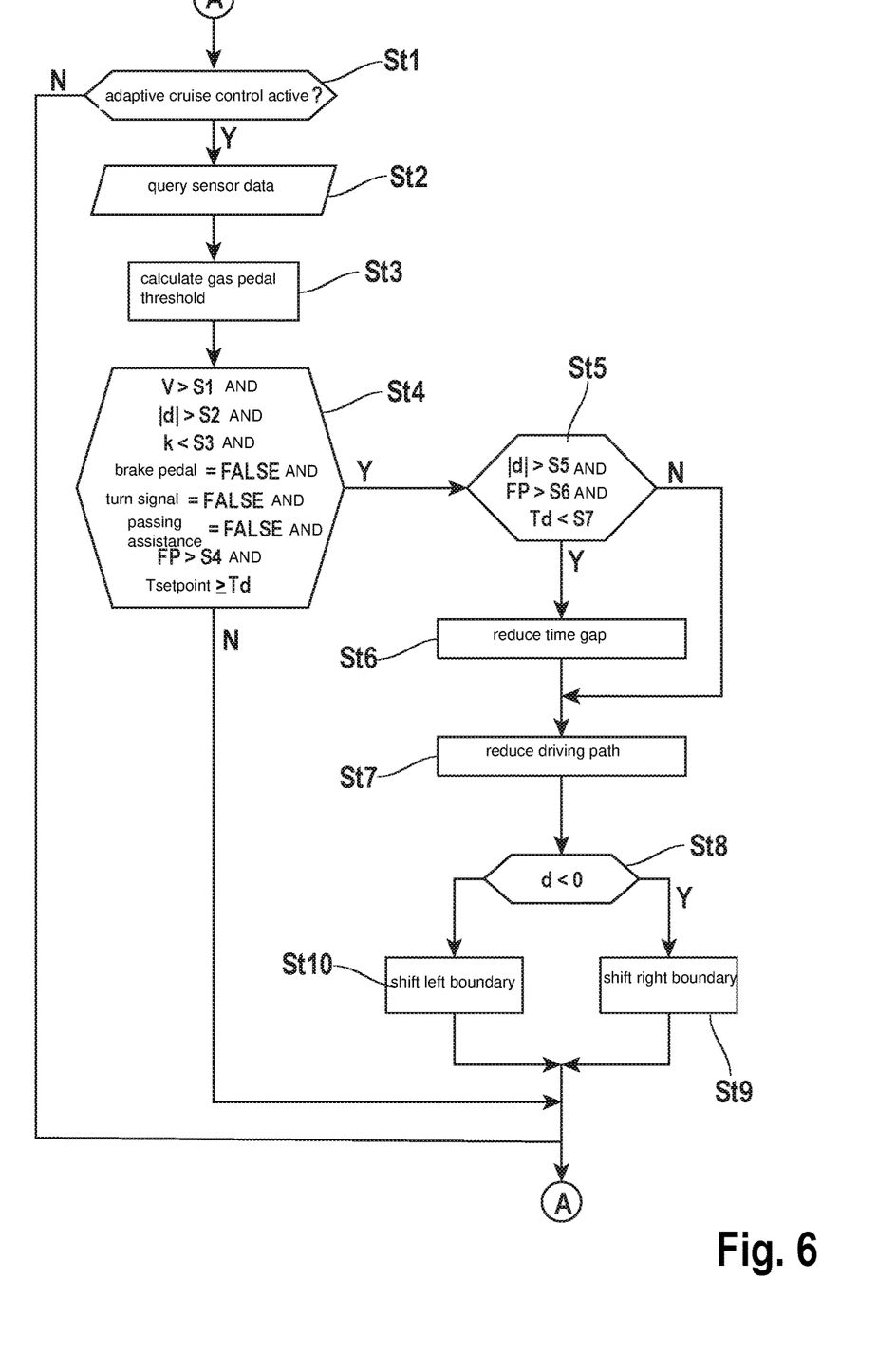
FIG. 6 shows a flowchart to explain a possible mode of operation of the driver assistance system according to an example embodiment of the present invention.

One example of a possible special embodiment of the dynamic function is represented in FIG. 6 in the form of a flowchart. The routine represented by this flowchart is cyclically repeated in longitudinal guidance model 12 as long as adaptive cruise control function 20 is active.

In step St1, it is checked whether the adaptive cruise control function is active. When this is not the case (N), the entire routine for the dynamic function is skipped. Otherwise (Y), the data of locating system 10 are queried in step St2. Based on these data, a gas pedal threshold or twist grip threshold is then calculated in step St3. The gas pedal or the twist grip of the vehicle forms input device 24 in this exemplary embodiment. When the driver actuates the gas pedal or the twist grip, and the gas pedal or the twist grip exceeds the threshold calculated in step St3, this is interpreted as a command for triggering the dynamic function. For example, the stronger the lateral position (the position perpendicular to the driving direction) of preceding vehicle 26 deviates from the center of lane 28, or from the center of driving path 18, and the faster the transverse movement of the preceding vehicle takes place, the more strongly the gas pedal threshold or the twist grip threshold is lowered.

In step St4, a series of criteria is then checked, which all have to be met for the dynamic function to be triggered. A first criterion is that velocity v of the host vehicle must be above a certain threshold value S1. In a low velocity range, for example in city traffic, the dynamic function is not useful. Rather, this function is primarily intended for expressway traffic.

A further criterion is that the absolute value |d| of the transverse offset of vehicle 26 must be above a certain threshold value S2.

This criterion is an indication of vehicle 26 being about to leave the driving path. Transverse offset d is defined in the process as the lateral deviation of vehicle 26 from the center of driving path 18.

A further criterion is that curvature k of the driving path is below a certain threshold value S3. The curvature of the driving path is determined by the presumable course of the host vehicle and is, as usual, calculated based on dynamic data of the host vehicle as well as, if necessary, also based on location data denoting the progression of the roadway, for example guard rails, guard rail posts or, when a video system is present, also roadway markings. The limitation to small driving path curvatures is to prevent faulty activations of the dynamic function from occurring in the case of a very curvy roadway due to lateral deviations being erroneously interpreted as an indication of a lane change.

Further criteria relate to the brake pedal not being actuated by the driver of the host vehicle, and the driver of the host vehicle also not being about to initiate a lane change. It is therefore required that the turn signal is not activated, and also a possibly present passing assistance function is not active.

A decisive criterion is furthermore that the extent FP of the actuation of the gas pedal or of the twist grip is above a threshold value S4, which was calculated in step St3.

Finally, the condition must be met that a following travel situation is actually present, i.e., that setpoint time gap Tsetpoint selected by the driver is not smaller than instantaneous time gap Td (instantaneous distance of vehicle 26 divided by velocity v).

When all these conditions are met (Y), a driving path reduction is ultimately carried out in step St7. Otherwise (N) the routine is ended.

In the case of a positive result in step St4, it is checked in step St5 whether all criteria for a reduction of the time gap are met. One of these criteria is that the absolute value |d| of the transverse offset of vehicle 26 not only exceeds threshold value S2, but also a higher threshold value S5. This criterion is an even stronger indication of vehicle 26 being about to leave its own driving lane.

A further criterion is that also extent FP of the actuation of the gas pedal or of the twist grip exceeds a higher threshold value S6. This means that the reduction of the time gap only takes place when the driver emphatically demands the dynamic function, and for this purposes depresses the gas pedal more strongly or twists the driving twist grip further.

Finally, the criterion that the instantaneous time gap Td is not greater than a certain threshold value S7 is also checked. In this way, the reduction of the time gap, and the acceleration of the vehicle associated therewith, are prevented from being initiated too soon.

When all these criteria are met (Y), the width of the time gap is reduced in step St6. Otherwise (N), step St6 is skipped, and the reduction of the driving path follows directly in step St7. However, in step St7 it is only decided that the width of the driving path is to be reduced, and it is not yet established whether this is to take place by shifting the left boundary or the right boundary of the driving path.

For this decision, it is checked in step St8 whether the lateral offset d is positive or negative. When it is negative (d<0), this means that vehicle 26 is pulling out to the right, and the right boundary of driving path 18 is shifted (to the left) in step St9. When the transverse offset is positive, the left boundary of the driving path is shifted (to the right) in step St10.

The routine is ended with step St9 or step St10, and a return to step St1 takes place.

Threshold values S1 to S7, which are checked in steps St4 and St5, may be constant or varied according to the situation, depending on the specific embodiment.

What is claimed is:

1. A driver assistance system for a motor vehicle, which is a host vehicle, comprising:
   a locating system configured to locate preceding vehicles; and
   a longitudinal guidance module configured to control longitudinal movement of the host vehicle as a function of location data of located objects;
   wherein the longitudinal guidance module includes a driving path module to define a driving path ahead of the host vehicle, and an adaptive cruise control function to adjust a time gap between the host vehicle and a target object located inside the driving path to a setpoint value,
   wherein the longitudinal guidance module further includes a dynamic function to, under particular conditions indicating that the target object will leave the driving path, modify the longitudinal guidance function when a driver commands a commencement of an acceleration in response to a command of a driver,
   wherein the dynamic function modifies the longitudinal guidance function by reducing a width of the driving path,
   wherein when the width of the driving path is to be reduced, checking whether a lateral offset is positive or negative, when the lateral offset is negative, a right boundary of the driving path is shifted to the left, and wherein when a transverse offset is positive, a left boundary of the driving path is shifted to the right,
   wherein the dynamic function becomes available when the adaptive cruise control function is active, the brake pedal is not actuated by the driver of the host vehicle, and the driver of the host vehicle does not intend to initiate a lane change so that the turn signal is not activated,
   wherein the dynamic function is only triggered and the driving path is reduced when the following conditions are satisfied:
   (a) a velocity of the host vehicle is above a first threshold value;
   (b) an absolute value of a transverse offset of the vehicle is above a second threshold value, which indicates that the vehicle is leaving or about to leave the driving path, wherein the transverse offset is defined as a lateral deviation of the vehicle from a center of the driving path;
   (c) a curvature of the driving path is below a third threshold value; and
   (d) actuation of a gas pedal or a twist grip is above a fourth threshold value.

2. The driver assistance system as recited in claim 1, wherein the dynamic function modifies the longitudinal guidance function by reducing the setpoint value for the time gap.

3. The driver assistance system as recited in claim 1, wherein one of the conditions which has to be met for the modification of the longitudinal guidance function is that an absolute value of a lateral offset of the preceding vehicle is smaller than a certain threshold value.

4. The driver assistance system as recited in claim 1, wherein an input device for inputting the driver command is: (i) a device for detecting a position of a gas pedal of the vehicle, or a device for detecting a position of a hand grip of the vehicle, and (ii) for comparing the detected position to a threshold value.

5. The driver assistance system as recited in claim 4, wherein the dynamic function varies the threshold value for the position of the gas pedal or the position of a hand grip, according to a situation.

6. The driver assistance system as recited in claim 4, wherein the dynamic function modifies the longitudinal guidance function by reducing the setpoint value for the time gap, and wherein when the driver actuates the gas pedal or the hand grip and when the gas pedal or the hand grip exceeds a calculated threshold, there is a command for triggering the dynamic function.

7. The driver assistance system as recited in claim 1, wherein the following are satisfied:
- (e) the brake pedal is not being actuated by the driver of the host vehicle;
- (f) the driver of the host vehicle is not initiating a lane change, so that the turn signal is not activated; and
- (g) a following travel situation is present, so that the setpoint time gap selected by the driver is not smaller than an instantaneous time gap.

* * * * *